Sept. 12, 1950 R. C. DEHMEL 2,522,434
CONTROL RESPONSE TRAINER FOR AIRCRAFT PILOTS
Filed Oct. 14, 1944 2 Sheets-Sheet 1

INVENTOR.
RICHARD CARL DEHMEL

Sept. 12, 1950     R. C. DEHMEL     2,522,434
CONTROL RESPONSE TRAINER FOR AIRCRAFT PILOTS Filed Oct. 14, 1944     2 Sheets-Sheet 2

INVENTOR.
RICHARD CARL DEHMEL
BY Ward Crosby & Neal
his Attorneys

Patented Sept. 12, 1950

2,522,434

UNITED STATES PATENT OFFICE 2,522,434

CONTROL RESPONSE TRAINER FOR AIRCRAFT PILOTS

Richard C. Dehmel, Short Hills, N. J.

Application October 14, 1944, Serial No. 558,625

10 Claims. (Cl. 35—12)

The invention relates to an improvement in apparatus for acquainting student pilots with the response of aircraft to its controls, and the disclosure constitutes a further development of some of the features disclosed in my pending application, Serial No. 398,590, filed June 18, 1941, entitled "Method and Means for Aircraft Flight Training." This application has now matured into Patent No. 2,494,508, dated January 10, 1950.

In the operation of an actual airplane, the controls become "sloppy" as the air speed of the airplane decreases, and this becomes noticeably so as stalling speed is approached. At this time there is only slight restraint on the freedom of movement of the different manual controls. On the other hand, as the air speed increases it becomes more and more difficult to actuate the manual controls due to increase in the air resistance imposed on the ailerons, rudders, elevators and like movable parts exposed to the air currents.

An object of the present invention is to provide a simple and improved form of device constructed and arranged to impose on one or more of the simulated aircraft controls of an aircraft trainer such a degree of resistance to the manually imposed movement as will approximately correspond in its intensity of resistance to what the student would have to operate against if in an airplane actually flying at the assumed speed.

Broadly, the invention contemplates the provision of electro-mechanical means for providing a resistance to manual action, or "control-loading," which is so controlled as to vary directly with the simulated air speed and which will be substantially instantaneous in its response to changes in its controlling conditions.

Various other objects and advantages of the invention will be in part obvious from an inspection of the accompanying drawings and in part will be more fully set forth in the following particular description of one form of device embodying the invention, and the invention also consists in certain new and novel features of construction and combination of parts hereinafter set forth and claimed.

Figure 1:
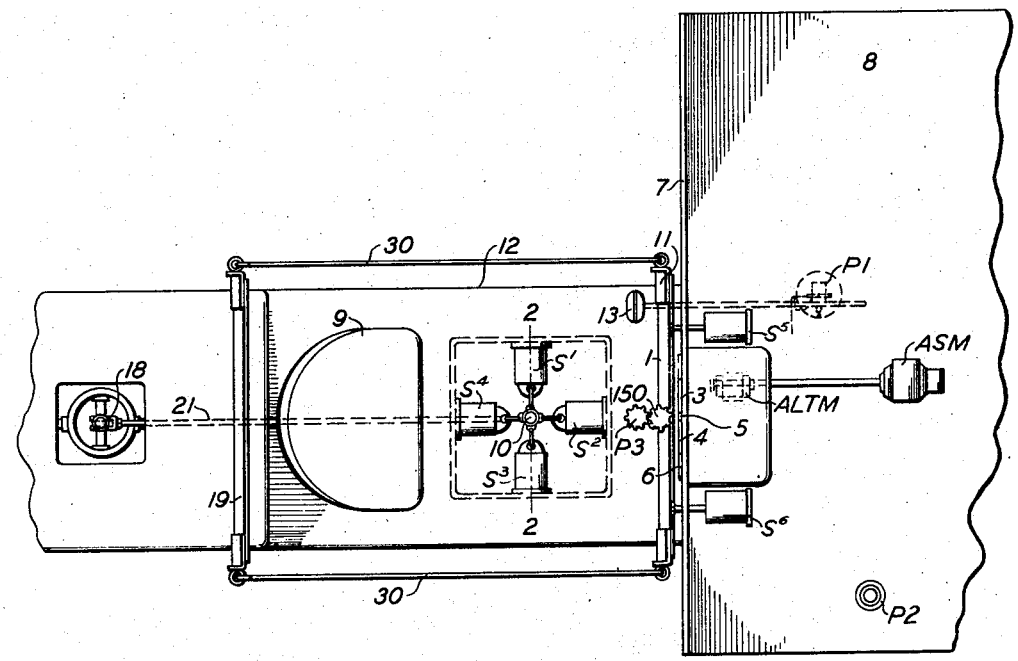
Figure 1 is a plan view of part of a simulated aircraft control such as disclosed in the above identified application, and illustrating associated therewith one embodiment of the present invention.

Referring to so much of the disclosure in the pending application as may be necessary to support the present disclosure, there is copied therefrom parts of the following structures, using the same reference characters: By reference to Figure 1, it may be seen that the instrument flight, training assembly comprises a complement of instruments consisting of a meter 1 depicting air speed; a meter 3 depicting rate of climb; a meter 4 depicting altitude; a meter 5 depicting compass course, each mounted on the instrument board 7 positioned in front of the student pilot seated at 9. A stick 10 simulating the conventional aileron-elevator control of aircraft, a rudder bar 11 simulating a conventional rudder control of aircraft, and other mechanism including a control 13 simulating throttle control of an aircraft are mounted for operation by the student pilot on a frame 12. To provide for dual control facilities there is also disclosed an instructor's stick 18 and an instructor's rudder control rod 19 coupled to the student's stick 10 and rudder rod 11 respectively by shafts 21 and 30. It will be obvious to those skilled in this art that other forms of well known controls may be equally well employed instead of those shown in the present embodiment. For example, it is within the contemplation of the invention to use pedal controls instead of the rudder bar 11, and other forms of aileron-elevator control instead of the stick 10. It will also be understood that the term "stick" is intended to include any form of aileron-elevator control.

Means are provided whereby movement of the controls 10, 11 and 13 result in indications of the several meters on the instrument board as in an actual airplane. An air speed motor ASM is secured to a traversable table 8 and is connected to drive the air speed indicator 1 which is calibrated in terms of air speed units. Upon the table 8 is a hand operated, average speed control P2 arranged to permit the instructor sitting adjacent the table 8 to adjust the average speed of the air speed motor ASM to any desired cruising value, thereby enabling the student to solve problems at a faster rate as he acquires proficiency. The ASM motor is included in a motor circuit in which is also contained a series of rheostats arranged to affect the motor circuit and thus the ASM motor and its associated indicator 1 as the result of manipulations by the student or instructor of the controls 10, 11 and 13. Through connections not herein necessary to show, current, in the instant case shown to be alternating current, is supplied from a source 110 (Figure 4) through the control or rheostat P2 which regulates the change of speed of the ASM motor rotation when all controls are in their normal position. From rheostat P2 connection is had to the throttle rheostat P1 actuated by the throttle control 13 (Figure 1).

Figure 2:
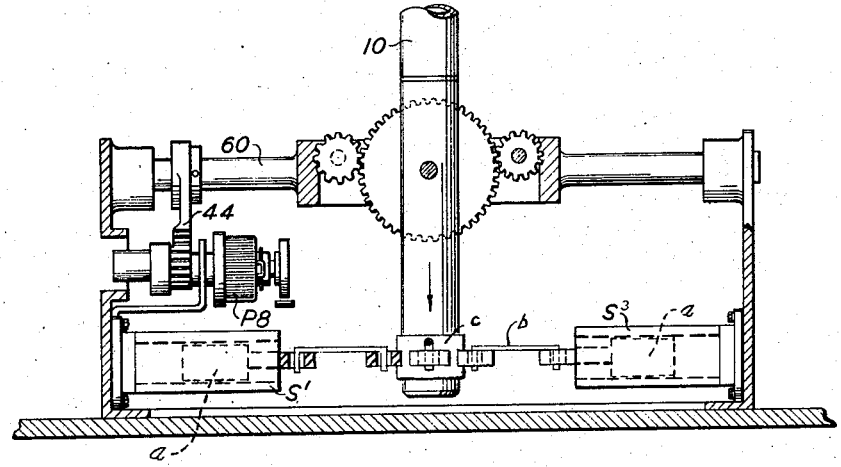
Figure 2 is a transverse sectional view taken on the line 2—2 of Figure 1 and showing further parts of the mechanism disclosed in said pending application.

The stick 10 functions when tilted from front to rear to operate through a chain of connected parts, 60—44, shown in Figure 2 to control a rheostat P8. For example, climbs are performed by back pressure on the elevator control 10 which rotates the rheostat P8 to increase resistance in the ASM air speed motor circuit in a way to cause some reduction in the indicated air speed on meter 1. The maneuver of diving is accomplished by forward pressure on the elevator control 10; recovery from the dive is by relaxation of forward pressure or the exertion of back pressure to hasten the pull out, all of which affects the readings on the corresponding meters and likewise affects the associated rheostats including rheostat P3. Lateral movement of the stick 10 also affects the air speed motor circuit through instrumentalities disclosed in the pending application, but enough is herein disclosed to show that the motor circuit is affected by the shifting of the manual control 10.

Shifting of the rudder 11 rotates gear 150 and this in turn operates rheostats P3 and P4, the former of which is in the motor circuit.

There is also included in the apparatus as described in the pending application a steering control motor which controls a rheostat P10; and an air speed control motor which controls a rheostat P13. These two motors have as a purpose the introduction of time delay between the operation of the rudder, aileron or elevator controls and the response of the instruments 1, 2, 3, 4 and 5. The manner of connecting these motors so as to be governed by the controls 10, 11 and 13 is disclosed in the pending application but forms no necessary part of this disclosure. Subject matter disclosed but not claimed herein is claimed in said copending application.

The rate of climb meter 3 is operated by direct connection with altitude motor, ALTM, which also responds to controls 10, 11 and 13 through parts disclosed in the said pending application. Inasmuch as the several rheostats P1, P2, P8, P3, P10 and P13 are each in series with the other and with the ASM motor, any change in adjustment of any one will vary the speed of the motor ASM and incidentally will correspondingly vary the air speed indicator 1.

Figure 4:
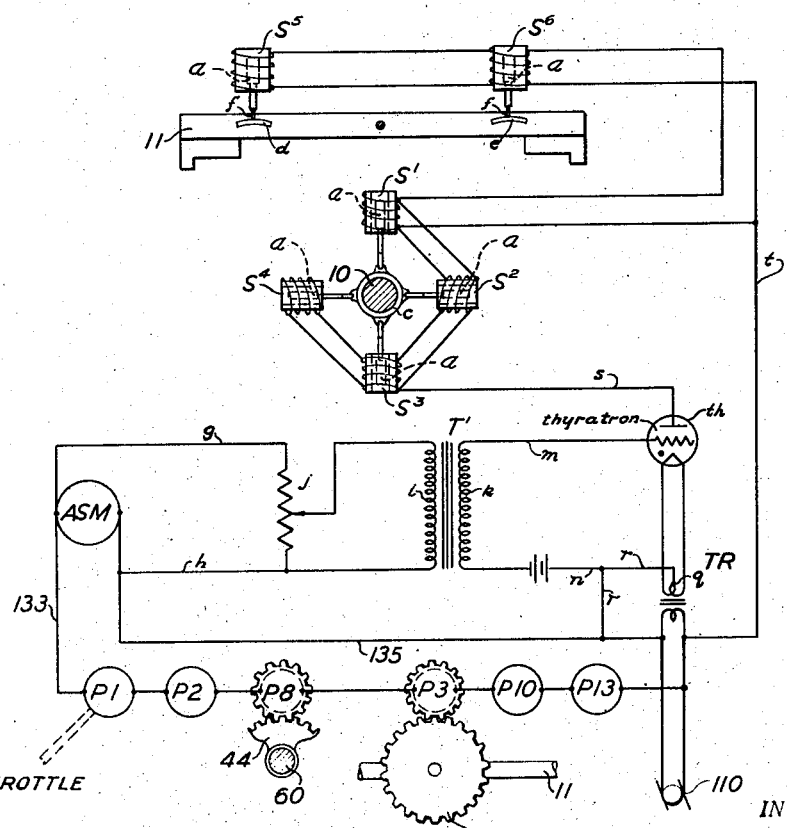
Figure 4 is a schematic circuit diagram of certain of the apparatus disclosed in the preceding figures.

In place of the four springs such as are used in the pending application for imposing resistance to the movement of the control 10, there is substituted in this disclosure four solenoids, $S^1$, $S^2$, $S^3$, and $S^4$, which are grouped about the lower end of the stick 10 and extend therefrom radially 90 degrees apart as shown in Figures 1 and 4. The solenoids may be of the same construction, or the pair comprising solenoids $S^1$ and $S^3$ may be of larger or smaller size than the pair comprising solenoids $S^2$ and $S^4$. Each solenoid is provided with a laminated plunger $a$ slidable axially in the solenoid, universally pivotally connected at their ends to links $b$ which in turn are universally pivoted to ears on a ring $c$ secured to the lower end of the stick 10. The plungers of the several solenoids are normally substantially centered in their casings and are so arranged that when the solenoids are energized they tend to resist any displacement from their normal position and the solenoid windings will exert a push or pull on their associated plungers when the plungers are displaced from their normal positions. As the two solenoids of each pair are of equal size and arranged in opposing pairs, they will tend mutually to counterbalance each other and thus hold the stick 10 in its normal upright position with a force depending upon the current strength at that instant of time passing through the four solenoids. It is obvious that with increase of current strength in the solenoids, the more rigidly will the stick be held in its normal, inoperative position, and the greater will be the force imposed on the stick to resist movement thereof in any direction away from such normal upright position.

Referring to the rudder control bar 11, it will be noted that it is provided on opposite sides of its centrally positioned pivot with a pair of loops $d$ and $e$ to which are attached by links $f$ the plungers $a$ of a pair of solenoids $S^5$ and $S^6$. These solenoids when energized exert a pull in the same direction on opposite sides of the pivot of the bar 11, thus holding the bar with a force tending to resist its movement by one foot or the other of the student. As was the case in connection with the stick controlling solenoids, the rudder bar controlling solenoids exert a restraint on the rudder bar and resist its movement by a force proportionate to the current strength flowing at that instant of time through the solenoids $S^5$ and $S^6$.

It is thus seen that viewing the solenoids collectively, they act in a tendency to restrain the movement of the controls associated therewith and that this restraint is dependent upon the current strength in the solenoids and which, as will hereinafter be described, is dependent upon the drop of potential across the ASM motor and thus proportionate to the speed of the motor and to the air speed as indicated by the meter 1.

Referring to the electric connections between the several parts as indicated on the diagram of Figure 4, there is provided a motor circuit which includes the motor ASM, connected through lead 135 with one of the leads of the source of alternating current supply 110. The other side of the motor is connected through the lead 133 and through the rheostats P1, P2, P8, P3, P10, P13 to the other side of the alternating current source.

Means are provided for energizing the several solenoids from the source of current supply and to control the pulling force of these solenoids so that the pull of the solenoids will vary with the simulated air speed as shown by the indicator 1. It is also proposed through the same means to rectify the A. C. current used so as to supply D. C. current to the solenoids and thus provide powerfully acting solenoids from, say, a 110 volts alternating current source. For this purpose a thyratron circuit with an associated transformer $T^1$ is shunted across the motor circuit.

The primary of the transformer is connected by leads $g$ and $h$ to opposite sides of the ASM motor under control of a manually actuated variable potentiometer $j$ for varying the sensitivity of the system. The secondary $k$ of the transformer $T^1$ is included in the grid circuit of a thyratron $th$, through a lead $m$ connected to the grid and a lead $n$ connected to one side of the source 110. The heater circuit of the thyratron includes a filament transformer TR having its secondary center tapped at $q$ and connected to lead $n$ and to lead 135 through conductor $r$. The several solenoids $S^1$, $S^2$, $S^3$, $S^4$, $S^5$, and $S^6$ are disposed in parallel and are included in a solenoid circuit which includes lead $s$ in the plate circuit of the thyratron and lead $t$ leading from the opposite sides of the two sets of solenoids to the current source lead 110.

In operation, and assuming that there is at least some current flow through the several solenoids, it is seen that the plunger of each solenoid will be held conventionally in its respective core and each plunger will tend to resist any outside force which tends to push or pull it out of its core. As the solenoids are arranged in balancing pairs of equal strength, their pull on the lower end of stick 10, for instance, will be equal and opposite, thus holding the stick rigid in its upright neutral position as shown in Figure 2. Should the operator attempt to shift the stick, say clockwise, from the position shown in Figure 2, he will be resisted by the pull of the right solenoid $S^3$ on its associated plunger, in resisting the further displacement of the plunger. Under these conditions, the left solenoid $S^1$ also resists the clockwise rotation of the stick 10 and, likewise, both solenoids will resist a counterclockwise rotation of the stick as it is shifted to the left of its neutral position.

Figure 3:
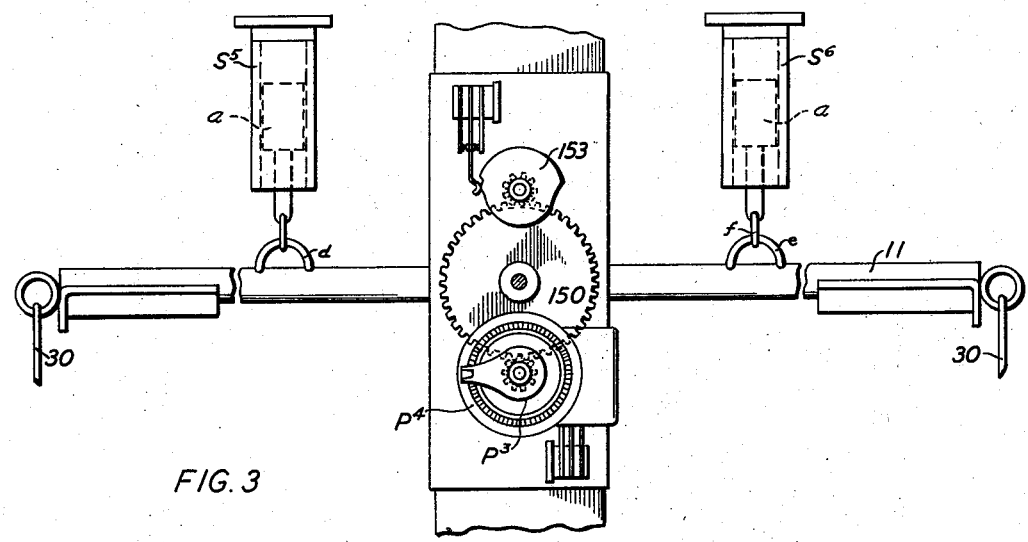
Figure 3 is a plan view of the rudder control shown in Figure 1.

Similarly, the shifting of the rudder rod 11 clockwise as viewed in Figure 3 will be resisted by the right solenoid $S^6$ in a degree proportionate to the intensity of the current flow through the solenoid at that instant of time. The left solenoid $S^5$ will also resist movement of the plunger as it is pushed out of its core. Releasing foot pressure on the control rod permits the solenoids $S^5$ and $S^6$ to draw on their plungers, and as the solenoids are of the same size, there will be effected a balanced action therebetween which restores the rudder to its neutral position.

By means of an arrangement such as is illustrated in connection with either or both of the controls 10 or 11, these controls will be normally maintained in their zero or neutral position, and if removed from such position will automatically restore themselves to such neutral position when released from the manual load. This tendency of the solenoids to return the controls to their neutral position will be directly proportionate to the simulated air speed at which the device is assumed to be moving. Not only is it possible to control the resistance to the movement of the stick 10 and rod 11 at any instant by the shifting of these controls, but it is possible for the instructor by the manipulation of the control P2 to supplement the automatic control of the solenoids by his manual manipulation of the control P2. In this way the instructor can restore the controls to their neutral inoperative position irrepsective of what the student may be attempting to do through the shifting of the controls 10, 11 and 13.

It is understood that the force inherent at any instant of time in the several solenoids resisting the displacements of their associated plungers is a function of the speed of the ASM motor at that instant of time. With increase in motor speed there is a proportionate increase in the magnetic strength of the solenoids to resist displacement of their associated plungers and thus to resist displacement of the controls 10 and 11 connected to the plungers. With increase in the speed of the ASM motor the thyratron circuit operates conventionally to transform the A. C. electric force from the source 110 into a D. C. electric force to energize the several solenoids and at the same time to step up the current strength acting on the solenoids. As the thyratron acts quickly in response to changes in potential across the ASM motor, there is no more time lag between the inauguration of those factors which affect the motor circuit and the response of the solenoids thereto, than would occur in the actual airplane itself between the time the corresponding factors become operative on the rudder, ailerons and other controls and the instant of time when the resistances to movement of the manual controls are felt by the operator.

The disclosure features the utilization of the ordinary available alternating current which is most convenient for use in actuating the different instrumentalities in a training device of the type herein disclosed. At the same time by using the thyratron it is possible to utilize powerful solenoids of high voltage capacity and which can be made of relatively small overall dimensions to fit into the small spaces available for the same in a device of this character.

The electrically actuated solenoids herein featured have many advantages over the springs disclosed in the copending application, it being noted that by the use of a thyratron a greater variation and more powerful pulling effect is obtained than is possible with any acceptable size of springs. By simply duplicating the thyratron circuit acting to supply the solenoids, extremely powerful acting solenoids may be energized from available house alternating current.

In the following claims, wherever reference is made to a manual action, it is understood that such expression equally includes a foot action. Also, "simulated air speed" is intended to include any condition, such as electrical or physical, that is established to represent the assumed air speed of the trainer.

I claim:

1. In an aircraft training machine, the combination of a manually operable control member simulating the aileron-elevator controls of an airplane, a set of solenoids operatively associated with said control member and tending when energized to resist its manually caused movement, foot operated means simulating the rudder control of an airplane, a set of solenoids operatively associated with said foot operated means and tending when energized to resist foot movement thereof, means providing a solenoid circuit including both sets of solenoids with the solenoids arranged in parallel, a thyratron having one side of the solenoids in its plate circuit, a transformer having its secondary in the grid circuit of the thyratron, means providing a motor circuit with the primary of said transformer shunted off the same, said motor circuit including a plurality of rheostats in series, means for selectively changing the rheostat settings to vary the current passing through said motor circuit, and a single source of alternating current for supplying said motor circuit and the heater element of said thyratron and a lead operatively connecting the other side of said solenoids with said alternating current source.

2. In an aircraft training machine, the combination of a manually operable stick simulating the aileron-elevator controls of an airplane, a set of solenoids connected in parallel having their plungers arranged in opposing pairs and connected to the stick and when energized acting to resist its manually caused movement in any direction, a thyratron having one side of the solenoids in the plate circuit of the thyratron, a transformer having its secondary in the grid circuit of the thyratron, means forming a motor circuit with the primary of said transformer shunted off the same, said motor circuit including at least one rheostat, and means for selectively changing the rheostat setting thereby to vary the current supplied to said transformer and thus vary the current supplied through said thyratron to said solenoids.

3. In an aircraft training apparatus, the combination of a manually actuated control, a plurality of solenoids connected to the control and operating coactively when energized to resist the manually imposed movement from the neutral position of said control, means providing a motor circuit and including circuit controlling instrumentalities operatively controlled by the movement of said control to vary the motor circuit incidental to the shifting of said control from its neutral position, means providing a thyratron circuit shunted across the motor circuit, and means forming a solenoid circuit including said plurality of solenoids and the plate of the thyratron.

4. In an aircraft training device, the combination of a manually operable control, a solenoid for resisting the freedom of movement of the control, means providing a solenoid circuit connected to a source of alternating current and including said solenoid, a thyratron and the secondary of a transformer connected to the grid element of the thyratron, and means providing a motor circuit including an alternating current motor and the primary of said transformer and a variable resistance shunted across the leads connecting the motor and transformer primary, said motor circuit including at least one rheostat responsive to changes in position of the manually operable control.

5. In an aircraft training machine, the combination of means providing a motor circuit and including an air speed motor, and a plurality of rheostats connected to a source of alternating current, a manually actuated member simulating the aileron-elevator controls of an airplane, a manually actuated member simulating the rudder control of an airplane, means controlled by said manually actuated members and operating through the rheostats for controlling said motor circuit and thus for controlling said air speed motor, two sets of solenoids with the solenoids arranged in parallel, one set for each manually actuated member, the solenoids of each set acting on its associated member to restore it to a neutral position when removed therefrom and to resist its manually caused movement away from said neutral position, and an electric connection between said solenoids and said motor circuit and organized for controlling the load imposed by said solenoids on their associated manually actuated members by the current strength in said motor circuit.

6. Aircraft training apparatus including a simulated aircraft control device, motor driven means for indicating a simulated air speed, electrically energized means connected through a direct non-yielding connection to said control device and tending to resist any movement from the neutral position thereof, and means interconnecting the motor driven means and said energized means to cause the load imposed on the control device to vary as a function of the simulated air speed.

7. In an aircraft training device, the combination of a manually operable simulated aircraft directional control member, manually operable simulated aircraft air speed control means, electrical circuit means including variable electrical means, electro-motive means operatively connected to said directional control member through a non-yielding connection for exerting by itself a force in opposition to its movement from a neutral position, and electrically associated with said electrical circuit means, and an operative connection between said air speed control means and said variable electrical means for controlling said electric circuit in accordance with the movement of said air speed control means to thereby increase the opposition to the manual movement of said directional control member by a force produced by said electro-motive means progressively varying with the movement of the simulated air speed control means.

8. In aircraft training apparatus having simulated controls, a manually actuated control member, electro-responsive means connected to said control member through a non-yielding connection for yieldingly resisting by itself manual movement of said member from a neutral position, and electrical means including a plurality of potentiometers controlled according to the positioning of aircraft controls for deriving potential representing air speed throughout the normal range of air speed, said electro-responsive means arranged to be energized according to the magnitude of said derived potential for applying a force in varying degree to said control member simulating air speed loading thereof.

9. In aircraft training apparatus having simulated controls, a manually actuated control member, means for controlling the application of varying resistance forces to said member for simulating air speed loading including electric motive means connected through a non-yielding connection to said control member, and electrical means including a plurality of potentiometers controlled according to respective operation of aircraft controls for deriving potential representing air speed, said electric motive means adapted to be energized according to the magnitude of said potential so that it is effective by itself yieldingly to resist in varying degree movement of said control member from a neutral position for simulating air speed loading of said member.

10. In an aircraft training device having manually operable simulated aircraft controls and means for representing changes in simulated air speed, control loading means for simulating aerodynamic forces acting on said aircraft controls during flight comprising electro-motive means controlled by said air speed means and energized according to change in simulated air speed, and a non-yielding connection between said electro-motive means and said simulated controls whereby said electro-motive means by itself yieldingly opposes in varying degree according to simulated air speed movement of said controls from a neutral position thereby to represent aerodynamic loading.

RICHARD C. DEHMEL.

REFERENCES CITED

The following references are of record in the file of this patent:

UNITED STATES PATENTS

| Number | Name | Date |
|---|---|---|
| 2,316,181 | Ocker | Apr. 13, 1943 |
| 2,385,095 | McCarthy | Sept. 18, 1945 |

FOREIGN PATENTS

| Number | Country | Date |
|---|---|---|
| 852,687 | France | 1939 |